R. BARCLAY.
Chronometer Escapement.
No. 36,637.
Patented Oct. 14, 1862.
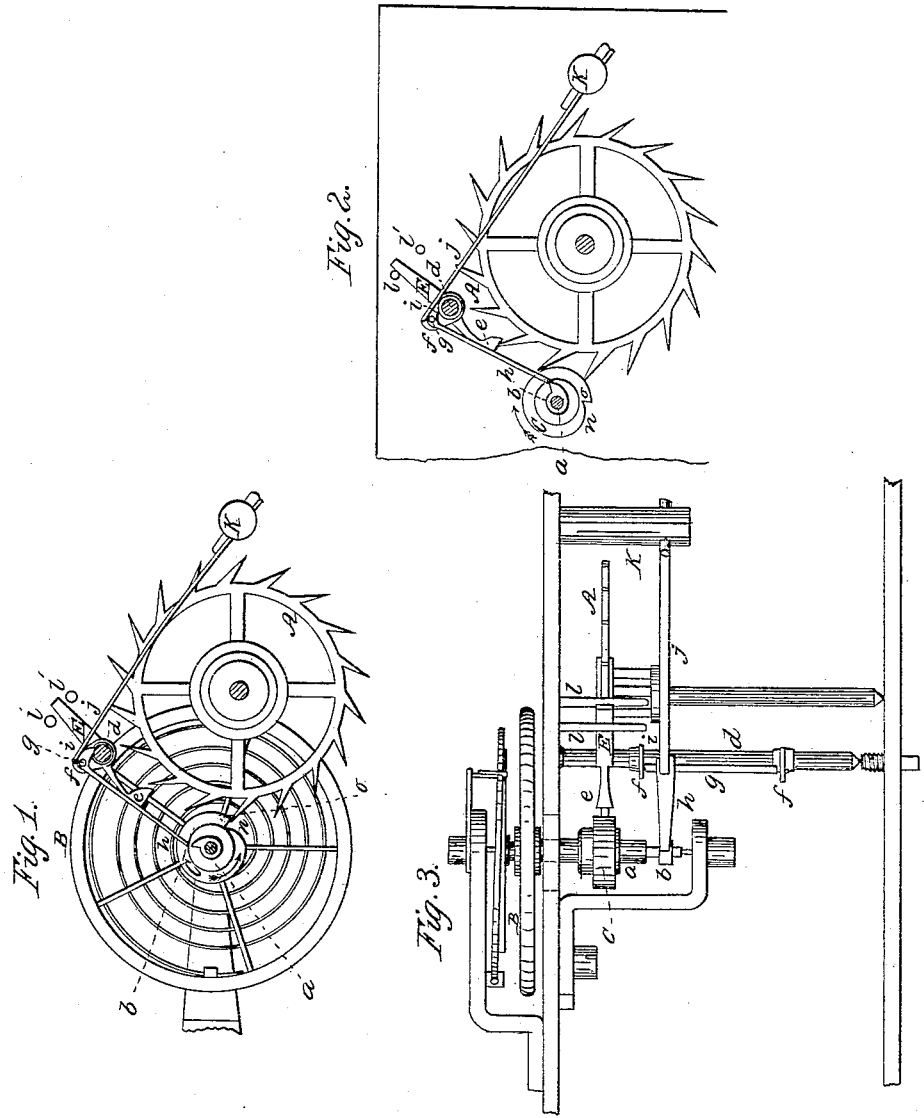
Witnesses:
James Laird
Timothy Shine
Inventor:
Robt. Barclay

UNITED STATES PATENT OFFICE.

ROBERT BARCLAY, OF BUFFALO, NEW YORK.

IMPROVEMENT IN CHRONOMETER-ESCAPEMENTS.

Specification forming part of Letters Patent No. 36,637, dated October 14, 1862.

*To all whom it may concern:*

Be it known that I, ROBERT BARCLAY, of Kilmarnock, in the county of Ayr, in the United Kingdom of Great Britain and Ireland, now residing temporarily at Buffalo, in the county of Erie and State of New York, have invented a new and useful Improvement in Escapements for Chronometers and other Time-Keepers; and I do hereby declare that the following is a full, clear, and exact description of the same, reference being had to the accompanying drawings, forming part of this specification, in which—

Figures 1 and 2 are plan views of an escapement with my improvement representing it at different stages of its operation. In Fig. 2 the balance and balance-spring are omitted. Fig. 3 is a view of the same, taken perpendicularly to Figs. 1 and 2.

Similar letters of reference indicate corresponding parts in the several figures.

The object of this invention is to dispense with the extremely delicate springs used in the kind of escapement known as the "chronometer-escapement," commonly used in chronometers, and to obtain an escapement in which all the advantages of the ordinary chronometer-escapement are retained, but which is no more liable to get out of order than a lever-escapement, and which is of such simple construction and adjustment that any watch-maker of ordinary skill can make and apply it; and to this end it consists in substituting for the springs ordinarily used an arm and pallet of repose, combined and applied as hereinafter described, and acted upon, substantially as hereinafter specified, by a single spring not requiring to be of any exact length.

To enable others skilled in the art to make and apply my invention, I will proceed to describe it with reference to the drawings.

A is the escape-wheel; B, the balance; $a$, the balance-staff; C, the cylinder, and $b$ the lifting-pallet, all constructed and arranged in the usual manner.

$d$ is a spindle arranged parallel with the balance-staff and escape-wheel spindle, carrying the short lever E, on which is the pallet of repose, $e$, the form of which is represented in Figs. 1 and 2. To this spindle there are also secured two short arms, $ff$, which contain the bearings for a much smaller spindle, $g$, arranged parallel with $f$. To this spindle is fastened the arm $h$, which constitutes one of the features of my invention, said arm being arranged opposite to the lifting-pallet $b$, and being of such length that the said pallet may strike its extremity, but pass it by, pushing it aside a short distance as the said pallet moves in either direction. The said arm $h$ has attached to it, or formed of the same piece with it, a short toe, $i$, upon which the spring $j$ acts to press it in contact with the spindle $d$. This spring may be of any length and attached to a fixed post, $k$, arranged in any position which allows the said spring to press upon the toe $i$, and hold it in contact with the spindle $d$, and by the same pressure it is caused to press the pallet $e$ into the escape-wheel as far as permitted by the pin $l$, against which the lever E rests, as shown in Fig. 2.

When the balance and cylinder are being carried back in the direction of the arrow shown in Fig. 2 by the recoil of the balance-spring, the lifting-pallet in striking and passing the extremity of the arm $h$ moves the said arm in a direction to raise the toe $i$ from the spindle $d$, and hence does not act upon the spindle $d$ or pallet of repose $e$, but leaves the escape-wheel resting against the said pallet. When the balance and cylinder move forward in the direction of the arrow shown in Fig. 1, the lifting-pallet in striking and passing the extremity of the said arm $h$ moves it in a direction to press the toe $i$ upon the spindle $d$, and so make a rigid connection between the said arm and the spindle, and cause the spindle to derive such a movement as to throw the pallet of repose from before the tooth of the escape-wheel, and permit the movement of the escape-wheel, the notch $n$ in the cylinder coming round in time to permit the action of the escape-wheel on the impulse-pallet $o$.

What I claim as my invention, and desire to secure by Letters Patent, is—

The arm $h$, made with a toe, $i$, the pallet of repose $e$, and the spring $j$, the whole applied in combination with each other, and with the escape-wheel and lifting-pallet, substantially as and for the purpose herein specified.

ROBT. BARCLAY.

Witnesses:
JAMES LAIRD,
TIMOTHY SHINE.